(No Model.)
R. M. HUNTER.
ELECTRIC RAILWAY.
No. 451,692. Patented May 5, 1891.
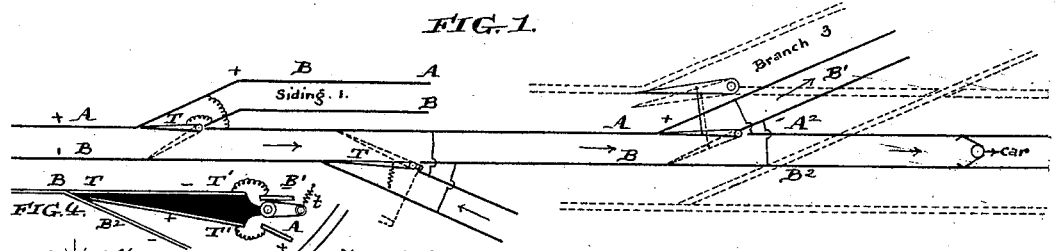
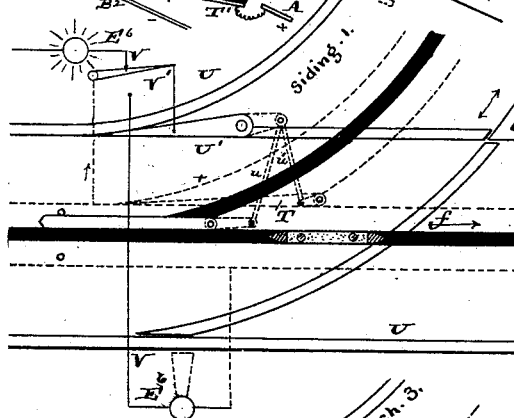
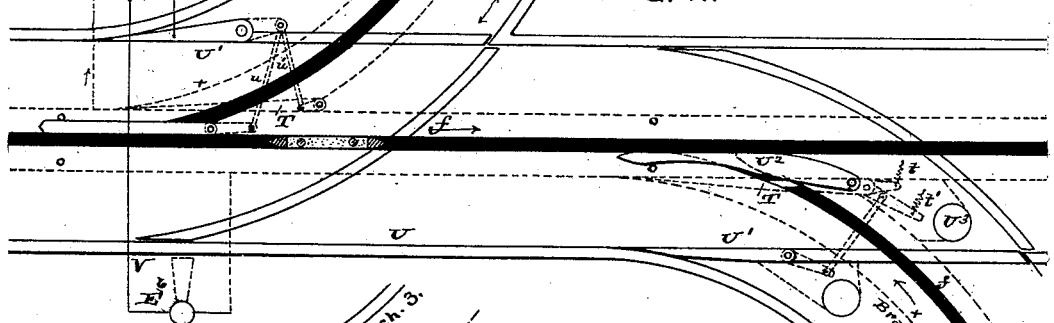
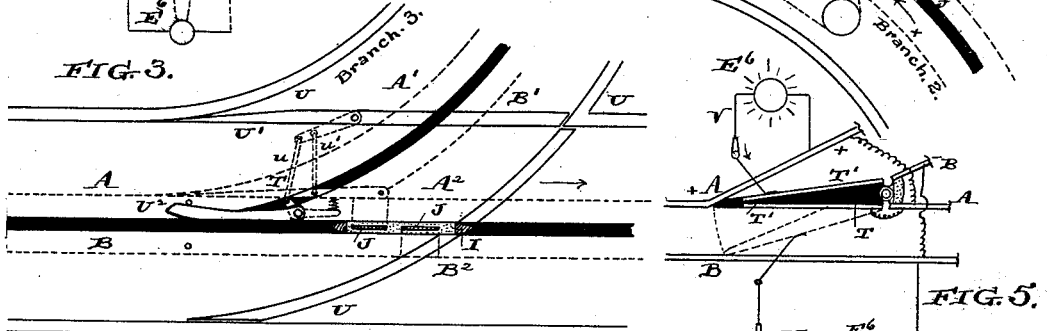
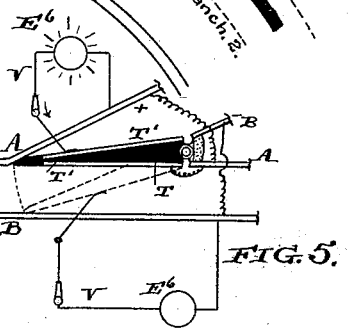
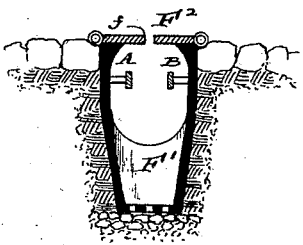
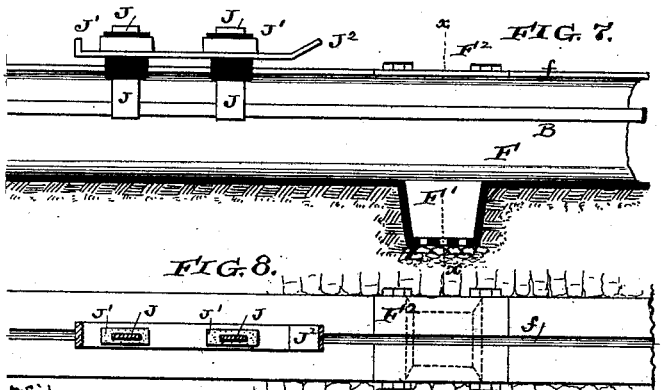
Witnesses: Inventor:

UNITED STATES PATENT OFFICE.

RUDOLPH M. HUNTER, OF PHILADELPHIA, PENNSYLVANIA, ASSIGNOR, BY MESNE ASSIGNMENTS, TO THE THOMSON-HOUSTON ELECTRIC COMPANY, OF BOSTON, MASSACHUSETTS.

ELECTRIC RAILWAY.

SPECIFICATION forming part of Letters Patent No. 451,692, dated May 5, 1891.

Original application filed April 28, 1888, Serial No. 200,400. Divided and this application filed February 25, 1889. Serial No. 301,139. (No model.)

*To all whom it may concern:*

Be it known that I, RUDOLPH M. HUNTER, of the city and county of Philadelphia, and State of Pennsylvania, have invented an Improvement in Electric Railways, (Case 85,) of which the following is a specification.

My invention has reference to electric railways; and it consists in certain improvements, all of which are fully set forth in the following specification and shown in the accompanying drawings, which form part thereof.

This application (Case 85) is a division of my application, Serial No. 200,400, filed April 28, 1886.

My invention has for its object the provision of a system of switches suitable for a main line of an electric railway, combined with sidings and outgoing and incoming branches, all of which may be used at one and the same time or at different times. These switches are so arranged that the brushes or collectors of the motors or cars are positively guided from one set of conductors to another, and may be combined with suitable switches for the tracks and slots, whereby not only is the vehicle guided in the proper direction, but the collector and the brushes are also positively insured to travel in the right slot and conduit. In the case of the siding, when the switch is open one conductor is supplied with positive and the other with negative current; but once on the siding and the switch closed both conductors supply similar currents, and the motor is securely prevented from accidentally forcing its way onto the main track again. Before it can be run off the switch must be turned. In the case of the incoming branch, or when a car is coming into the main line in a direction opposite to that in which the cars are normally traveling on said main line, the switches are provided with springs, whereby, while a car from the branch track may run onto the main line, pushing open the switches, the cars from the main line cannot run upon the branch track. The conductor-switch and slot-switch may be coupled together or the slot and rail switches alone may be coupled together. In the case of the outgoing branch, the switches for the rails, the slot, and conductors should all be coupled together. This is necessary, since, as the cars come end onto the switches, any one of which switches being misplaced would cause a breakage. By coupling them together the car cannot go farther wrong than running on the branch when it should continue on main line, or vice versa.

My object is also to combine the switches with electric signals and derived circuits in such a manner that when a branch or main line is closed the signal is automatically displayed. These signals may be red lights or semaphores, or both combined. They would receive their electrical motive power from the generating or home station, but must be controlled by the movement of the switch.

My object is further to provide an electric railway with an underground slotted conduit and insulated bared working-conductors located therein, and removable doors or covers forming part of the slot are arranged at intervals for an entrance to the conduit, and through which a carriage for assisting in repairing the conductors may be inserted and removed, as also for removing any broken parts of the collecting devices of the motors, and, if desired, the cleaning-wells may be located under said doors, as shown.

The foregoing are brief enumerations of the essential points involved in this specification, and I will now describe the accompanying drawings, in which—

Figure 1 is a plan view showing the main-line siding and incoming and outgoing branches of an electric railway. Figs. 2, 3, and 4 are enlarged plan views illustrating the switches shown in Fig. 1. Fig. 5 is a plan view of a switch in the working-conductors, combined with electric signal devices to indicate whether the branch or line is open. Fig. 6 is a cross-section of the conduit on line $x\,x$ of Fig. 7. Fig. 7 is a longitudinal section on line $y\,y$ of Fig. 6, and Fig. 8 is a plan view of the conduit.

Referring to Fig. 1, I have the conductors A B, combined with switches T and the siding 1 and branches 2 and 3. The ends of the working-conductors in the conduit at the branching points are stationary, but may have a movable section or switch as a guide, though this is not necessary. When such switch is used, it may be simply a guide or be provided with conductors on its sides, which may, in a general sense, be considered continuations of the working-conductors. The direction of the arrows indicates the direction of travel of the motors under normal working, and therefore on the same electric railway provision must be made for all of these conditions.

Referring to Fig. 2, I have an enlarged plan view of the connection of siding 1 and branch 2 with the main line. The siding-switch T is electrically connected with the conductor B of the siding, and the conductor A is electrically connected with the conductor A of the line. When the siding is closed, conductors A and B are of like polarity; but when open, as indicated in dotted lines, Fig. 1, they are of different polarity, and a car or motor may be run upon the siding. As soon as the switch is closed, it will be impossible for the operator or any one else, either accidentally or maliciously, to run the car back onto the line by operating the keys or switches on the motor. The switch of the siding-conductors may be connected to the rail-switch U' by crank and links $u'$, and also with the slot-switch $U^2$ by similar devices $u$, so that the collectors depending from the car through the slot $f$ may be caused to pass in the proper direction. If desired, the switch T may be coupled with the slot-switch $U^2$ alone; but I prefer all three to be coupled together wherever the car is to meet the switch-point on, or, in other words, approach the point of the switch. In the case of the branch 2, from which the cars run onto the main line, (but not from the main line onto the branch,) the switch T is made substantially as shown in Fig. 4, and provided with a spring $t$ to keep it normally closed, so that it shall offer no obstruction to the cars on the main line, and yet shall freely give way to allow of the collectors from the branch passing into the main-line conduit when a car is running from branch to main line. In this case, also, the slots are provided with a switch $U^2$, which may be connected to the rail-switch U' by line $u$, and the two may be operated by a spring $t'$ to keep the main line open, or the switches $U^2$ and U' may be separate and the switches T and $U^2$ connected; but the first construction—such as shown in Fig. 2—is probably the most satisfactory. The slot-switches would be constructed substantially like those in use on a cable railway, in which the end or point rests upon the conduits either above the slot or in a support immediately below it. The springs $t'$ $t$ would tend to force the collectors snugly against the continuous conductor, and this would be of particular use if, in the case of branch 3, the switch $U^2$, Fig. 3, were provided with a spring, as shown in Fig. 2, as then the collectors would be forced against the conductor A, which is continuous.

It is of course advisable to have the rail-switch somewhat in advance of the branching point in the conduit-slot as a guide to insure the proper travel of the car and its collectors, and the rail and slot switches would be in advance of the branching point of the working-conductors.

The construction of the switches at outgoing branch 3 is in all material respects the same as at the siding, except the electrical connection of the switch T, which should be like Fig. 4, in which the switch is provided with conductors T' on its sides connected, respectively, with the corresponding conductors $A^2$ and B' of the line and branch. The hinged connections of the conductor-switches may be had access to through hand or man holes $U^3$, having removable covers, and similar passage-ways may be made to the lower parts of the rail and slot switches to keep the connections in proper repair, as shown in Fig. 2.

A B and $A^2 B^2$ represent the line-conductors, and A' B' the branch conductor. If desired, these switches may be without conductors. The ends of the conductors A B may be secured to a standard or support, as shown in Fig. 5, and to this the independent movable switch-section may be supported by a hinged connection.

J J are the two collectors or brushes, Fig. 7, which project through the slot $f$ of the conduit F and take the current from the bared working-conductors A B. These brushes J project down into the conduit F through the slot $f$ and make a sliding connection with the conductors A B. The brushes J are carried by a frame $J^2$, which is to be supported by the car, and are insulated by insulation J'.

The conduit F is shown of metal, but may be made in any suitable manner. It is provided at intervals with doors $F^2$ opening into the interior upon one or both sides, and also opening into the slot, said doors forming part of the slot. Through these doors the collector-brushes may be inserted or withdrawn or examined for repairs. The conductors A B may be examined and connections made for testing purposes and also for removing dirt and rubbish which may be collected below them or in the drainage-wells F', arranged below them and opening from the bottom of the conduit. These drainage-wells may have perforated bottoms to allow the water to drain off, if desired. The doors $F^2$ are also useful when repairing the conductors A B or inserting new conductors, and likewise for inserting and removing the supporting-tools and carriages used in making such repairs to the conductors. The doors $F^2$ are shown as hinged; but I do not limit myself to any particular connection of said doors or covers with the conduit.

While I prefer the construction set out, I do not limit myself to the details thereof, as they may be modified in various ways without departing from the spirit of my invention.

Having now described my invention, what I claim as new, and desire to secure by Letters Patent, is—

1. A railway-track, a main-line conductor extending along said track, a branch track, a branch conductor extending along said branch track and conveying current of same polarity as main-line conductor, an electrical connection between the main-line and branch conductors, whereby the branch conductor receives current from the main-line conductor, and a switch between the main-line and branch conductors.

2. A railway-track, a main-line conductor extending along said track, a branch track, a branch conductor extending along said branch track, an electrical connection between the main-line and branch conductors, and a switch between the main-line and branch conductors and electrically connected with them.

3. A railway-track, a main-line conductor extending along said track, a branch track, a branch conductor extending along said branch track, an electrical connection between the main-line and branch conductors, a switch between the main-line and branch conductors and electrically connected with them, and electrically-actuated signals operated by the movement of the switch to indicate its position.

4. A railway-track, a main-line conductor extending along said track, a branch track, a branch conductor extending along said branch track, an electric connection between the main line and branch conductors, and a tapering switch between the main-line and branch conductors.

5. A railway-track, a main-line conductor extending along said track, a branch track, a branch conductor extending along said branch track, an electrical connection between the main-line and branch conductors, a switch between the main-line and branch conductors, slotted conduits inclosing said main and branch conductors, and a covered passageway leading from the surface of the railway to the pivot of the switch.

6. The combination of a main track, a siding-track, a positive and negative conductor for the main track, two conductors for the siding-track, one of which is in connection with one of the main-line conductors, and a switch for connecting the other siding-conductor with either the positive or negative main-line conductor.

7. The combination of a main track, a siding-track, a positive and negative line-conductor for the main track, two conductors for the siding-track, one of which is in connection with one of the main-line conductors and a switch for connecting the other siding-conductor with either the positive or negative main-line conductor, a track-switch, and a connection between the track and conductor switch whereby both operate simultaneously.

8. The combination of a main-line track and a branch track, a working conductor for each track, and a source of electric supply common to both conductors.

9. The combination of a main-line track and its conductor, a source of electric supply to said conductor, a branch track and its conductor at a distance from said source of electric supply, and an electrical connection between the main-line conductor and branch conductor.

10. The combination of a main-line track and its conductor, a source of electric supply to said conductor, a branch track and its conductor at a distance from said source of electric supply, an electrical connection between the main-line conductor and branch conductor, and a traveling collecting device adapted to travel over both conductors.

In testimony of which invention I hereunto set my hand.

RUDOLPH M. HUNTER.

Witnesses:
ERNEST HOWARD HUNTER,
E. M. BRECKENRIED.